(12) United States Patent
Philippi et al.

(10) Patent No.: US 8,137,739 B2
(45) Date of Patent: Mar. 20, 2012

(54) APPARATUS AND METHOD FOR THE MANUFACTURE OF A THREE-DIMENSIONAL OBJECT

(75) Inventors: Jochen Philippi, Munich (DE); Thomas Halder, Munich (DE); Thomas Mattes, Gilching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 714 days.

(21) Appl. No.: 11/628,022

(22) PCT Filed: Feb. 15, 2006

(86) PCT No.: PCT/EP2006/001366
§ 371 (c)(1),
(2), (4) Date: Nov. 28, 2006

(87) PCT Pub. No.: WO2006/105827
PCT Pub. Date: Oct. 12, 2006

(65) Prior Publication Data
US 2007/0196561 A1     Aug. 23, 2007

(30) Foreign Application Priority Data
Apr. 6, 2005    (DE) .......................... 10 2005 015 870

(51) Int. Cl.
*C23C 16/52* (2006.01)
(52) U.S. Cl. .......................................... 427/8; 427/595
(58) Field of Classification Search .................. 427/8
See application file for complete search history.

(56) References Cited

U.S. PATENT DOCUMENTS

| | | | | |
|---|---|---|---|---|
| 4,191,052 A * | 3/1980 | Drzewiecki | .................. | 374/135 |
| 4,859,832 A * | 8/1989 | Uehara et al. | ................. | 219/411 |
| 5,530,221 A | 6/1996 | Benda et al. | | |
| 5,649,265 A * | 7/1997 | Tabuchi | ......................... | 399/44 |
| 5,833,914 A * | 11/1998 | Kawaguchi | .................. | 264/400 |
| 5,908,569 A | 6/1999 | Wilkening et al. | | |
| 6,012,507 A * | 1/2000 | Auger et al. | ................. | 164/452 |
| 6,054,192 A | 4/2000 | Otsuka | | |
| 6,600,129 B2 | 7/2003 | Shen et al. | | |
| 6,780,368 B2 * | 8/2004 | Liu et al. | ....................... | 264/401 |
| 6,815,636 B2 | 11/2004 | Chung et al. | | |
| 6,930,278 B1 * | 8/2005 | Chung et al. | ............ | 219/121.85 |
| 2002/0177094 A1 * | 11/2002 | Shirakawa | ........................ | 432/4 |
| 2003/0000255 A1 * | 1/2003 | Kohmura et al. | .............. | 65/384 |
| 2004/0005182 A1 | 1/2004 | Gaylo et al. | | |
| 2004/0026807 A1 | 2/2004 | Anderson et al. | | |
| 2004/0104499 A1 | 6/2004 | Keller | | |
| 2005/0041723 A1 * | 2/2005 | Heerdt et al. | ................ | 374/129 |

FOREIGN PATENT DOCUMENTS
DE        100 07 711 C1    8/2001
(Continued)

*Primary Examiner* — Shamim Ahmed
(74) *Attorney, Agent, or Firm* — McDonnell Boehnen Hulbert & Berghoff LLP

(57) ABSTRACT

Provision is made of an apparatus and a method for the manufacture of three-dimensional objects (3) by local solidification of layers of a building material at positions corresponding to the respective cross-section of the object (3), by exposure to electromagnetic or particle radiation. The apparatus comprises a temperature measuring assembly (13) for non-contact measurement of the temperature of the building material in a measurement region (14) which is a partial region of the layer of the building material, and comprises further a position adjustment device (15) for altering the position of the measurement region (14) of the temperature measuring assembly (13) independently of the alteration of the position of the region exposed to the radiation energy. This apparatus can be used to actively access a not exposed region of the surface for measuring the temperature of each layer and to detect a temperature distribution by altering the position of a measurement region (14) in a layer.

21 Claims, 3 Drawing Sheets

FOREIGN PATENT DOCUMENTS

| | | |
|---|---|---|
| DE | 10 2004 017 769 | 12/2004 |
| EP | 1 466 718 A2 | 10/2004 |
| EP | 1 296 788 B1 | 1/2005 |
| JP | 10-211658 | 8/1998 |
| JP | 2004-74800 | 3/2004 |
| RU | 2 086 356 C1 | 8/2007 |

* cited by examiner

APPARATUS AND METHOD FOR THE MANUFACTURE OF A THREE-DIMENSIONAL OBJECT

FIELD OF THE INVENTION

The present invention relates to an apparatus and a method for the manufacture of a three-dimensional object according to the preamble of claims 1 and 10 respectively.

BACKGROUND OF THE INVENTION

Such an apparatus and such a method are known from DE 100 07 711 C1. There, a laser sintering apparatus is described wherein the temperature of the sinter powder in a moving detection area in the region of the sintering position is detected by means of a pyrometer and wherein the power of the laser is regulated in relation to the temperature detected.

Therein, the thermal radiation of the sintering position has a considerable influence on the temperature measured by the pyrometer. Depending on the degree of exposure of the powder, the emission capability of the surface is changing (ratio of the radiation energy emitted by the surface to the radiation energy emitted by a black body at the same temperature), thus falsifying the measurement result. Furthermore, the temperature measurement is falsified by reflected laser radiation. For that reason, the temperature thus measured does not represent a good measure for the temperature of the surface of the powder. bed. In laser sintering, however, the temperature of the powder bed surface is a decisive parameter for the quality of the produced component in relation to the building material used (sinter powder).

EP 1 466 718 A2 and EP 1 296 788 B1 each disclose an apparatus for the manufacture of a three-dimensional object, wherein the temperature of the powder bed surface over the entire working area is simultaneously measured by means of an IR camera in a spatially-resolved manner. One problem is that the optical system of the IR camera might become dirty in the apparatus. This dirt, which cannot be avoided entirely by blowing, results in measurement results which may be falsified in a position-depending manner. Furthermore, this temperature measurement is to disadvantage in that the IR camera is very expensive as compared with other non-contact temperature measuring instruments, such as a pyrometer.

For that reason, the present invention aims at providing an easy-to-handle and cost-effective apparatus and a simple and cost-effective method for the manufacture of a three-dimensional object by solidifying layers of a building material at the positions corresponding to the particular cross-section of the object, through the action of electromagnetic radiation or particle radiation, wherein said apparatus and said method can be used to produce three-dimensional objects of a high quality.

SUMMARY OF THE INVENTION

This problem is solved by an apparatus for the manufacture of a three-dimensional object according to claim 1 and by a method for the manufacture of a three-dimensional object according to claim 10. Further developments of the invention are described in the subordinate claims.

The invention has the particular advantage that the temperature of the building material to be solidified can be measured and, thus, controlled and/or regulated in a highly precise manner without being affected by the radiation energy introduced for solidification into the building material by electromagnetic radiation or particle radiation.

Furthermore, the invention has the advantage that a simple and. cost-effective point pyrometer can be used for temperature measurement wherein, contrary to an IR camera, said point pyrometer does not require any cooling. Moreover, the window required in the process chamber for the point pyrometer is considerably smaller than that required for an IR camera. A small window can, in turn, be kept free from any dirt caused by process gas much more easily by blowing and it reduces the risk of damage to the temperature measuring assembly by laser retroreflection, when a laser is used as the source of radiation.

Furthermore, the invention has the advantage that the measuring region can be selected, that means can be modified, in each layer. It is not necessary to keep in each layer a specific constant region of the building field free for temperature measurement; instead, it is possible to actively use an unoccupied region at any place of the building field for temperature measurement in each layer. As compared with temperature measurement using a fixed point pyrometer without position adjustment device, this allows improved utilization of the building field.

The invention has, furthermore, the advantage that, in a layer of the building material, it allows detection of a temperature profile which can then be used for local laser power correction, in order to adjust the introduced radiation energy more precisely to an optimum process window. As a result, a higher quality of the component can be obtained.

Over and beyond that, temperature distribution can be used as an input variable for controlling a position-depending heater of the powder bed. The compensation of local variations in temperature results in a higher quality of the component.

Further features and appropriate characteristics of the invention are disclosed by the description of exemplary embodiments by means of the accompanying drawings.

BRIEF DESCRIPTION OF THE DRAWINGS

In the figures.

DETAILED DESCRIPTION OF THE EMBODIMENTS OF THE INVENTION.

Figure 1:
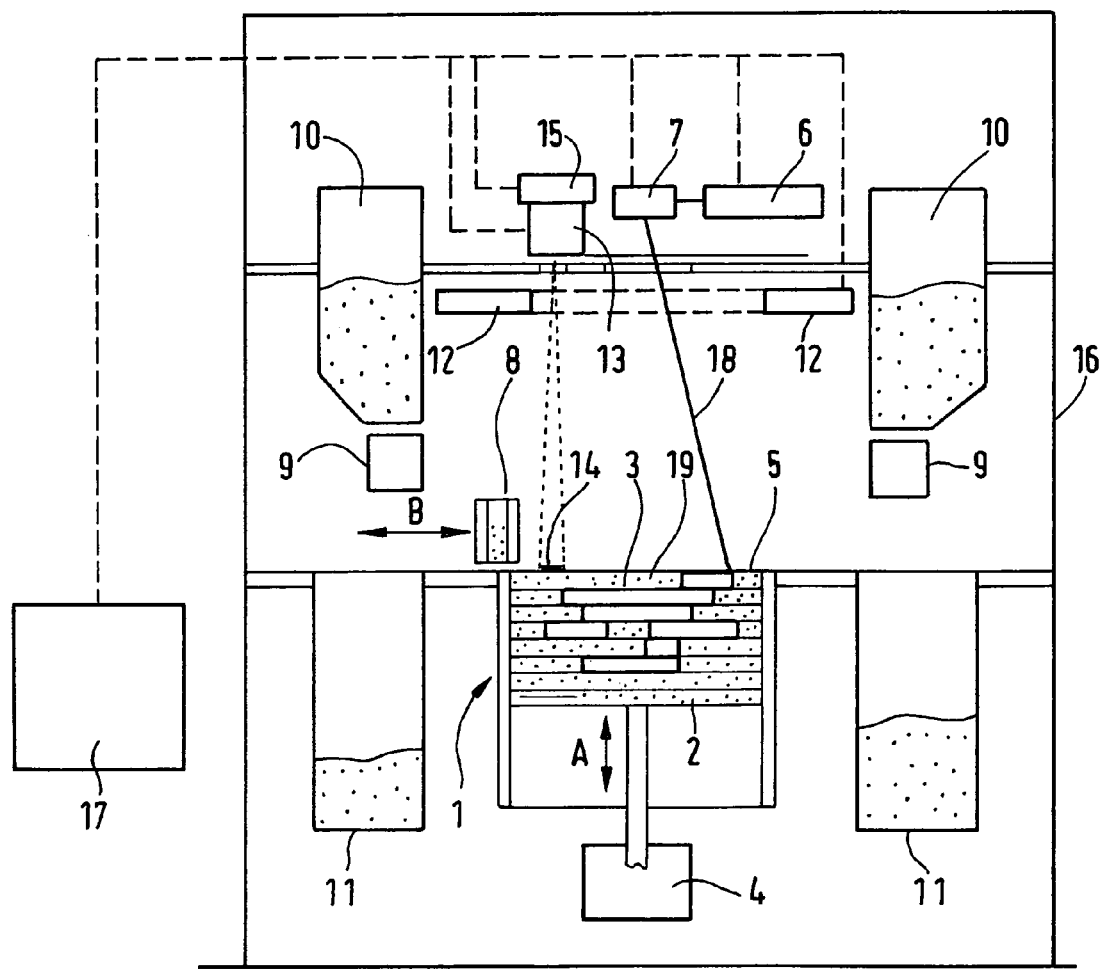
FIG. 1 is a schematic view of an exemplary embodiment of the apparatus for the manufacture of a three-dimensional object.

FIG. 1 shows a laser sintering apparatus as an exemplary embodiment of an apparatus according to the invention. The laser sintering apparatus comprises a container 1 that is open towards the top. A support 2 for carrying the object 3 to be built is provided in said container 1. The support 2 can be moved up and down in vertical direction A in the container 1 by means of a drive 4. The upper edge of the container 1 defines a working plane 5. Above said working plane 5, an irradiation assembly 6, which emits a directed laser beam 18 deflected onto the working plane 5 through a deflection device 7, is arranged in the form of a laser. Moreover, a coating device 8 is provided for applying a layer of a powder building material to be solidified onto the surface of the support 2 or onto the last layer that has been solidified before. The coating device 8 can be moved back and forth across the working plane 5 by means of a drive schematically indicated by the arrows B. Two dosing devices 9 to the left and right of the building field supply the coating device from two powder reservoirs 10. In addition, two overflow containers 11 which can receive the excess powder accumulating during coating, are provided to the left and right of the building field.

Furthermore, the apparatus comprises above the working plane 5 a heating device 12 for heating the powder bed 19 and particularly for preheating a consolidated powder layer that has been applied but not sintered yet to a working temperature $T_A$, which is appropriate for sintering. For example, the heating device 12 is designed in the form of one or a plurality of radiant heaters, such as an infrared radiator, which is/are arranged above the working plane 5 such that the applied powder layer can be heated in a uniform manner.

A temperature measuring assembly 13 serving for non-contact measurement of the temperature of the last powder layer that has been applied before or of the uppermost powder layer, respectively, is provided spaced apart from and above the working plane 5. Therein, the temperature measuring assembly 13 measures the mean temperature in a measurement region 14 occupying a smaller area than the powder layer applied in the building field. The position of the measurement area 14 of the temperature measuring assembly 13 can be altered within the working plane by means of a position adjustment device 15.

The working area is secluded from the environment by means of a process chamber 16. If necessary, this can prevent oxidation of the powder.

A control and/or regulation device 17 serves to control and/or regulate the power of the heating device 12, the power of the irradiation assembly 6, the deflection achieved by the deflection device 7 and to drive the position adjustment device 15 as well as to read the temperature of the powder bed 19 that is measured by the temperature measuring assembly 13. To achieve this, the control and/or regulation device 17 is connected to the heating device 12, the temperature measuring assembly 13, the position adjustment device 15, the deflection device 7 and to the irradiation assembly 6.

Figure 2:
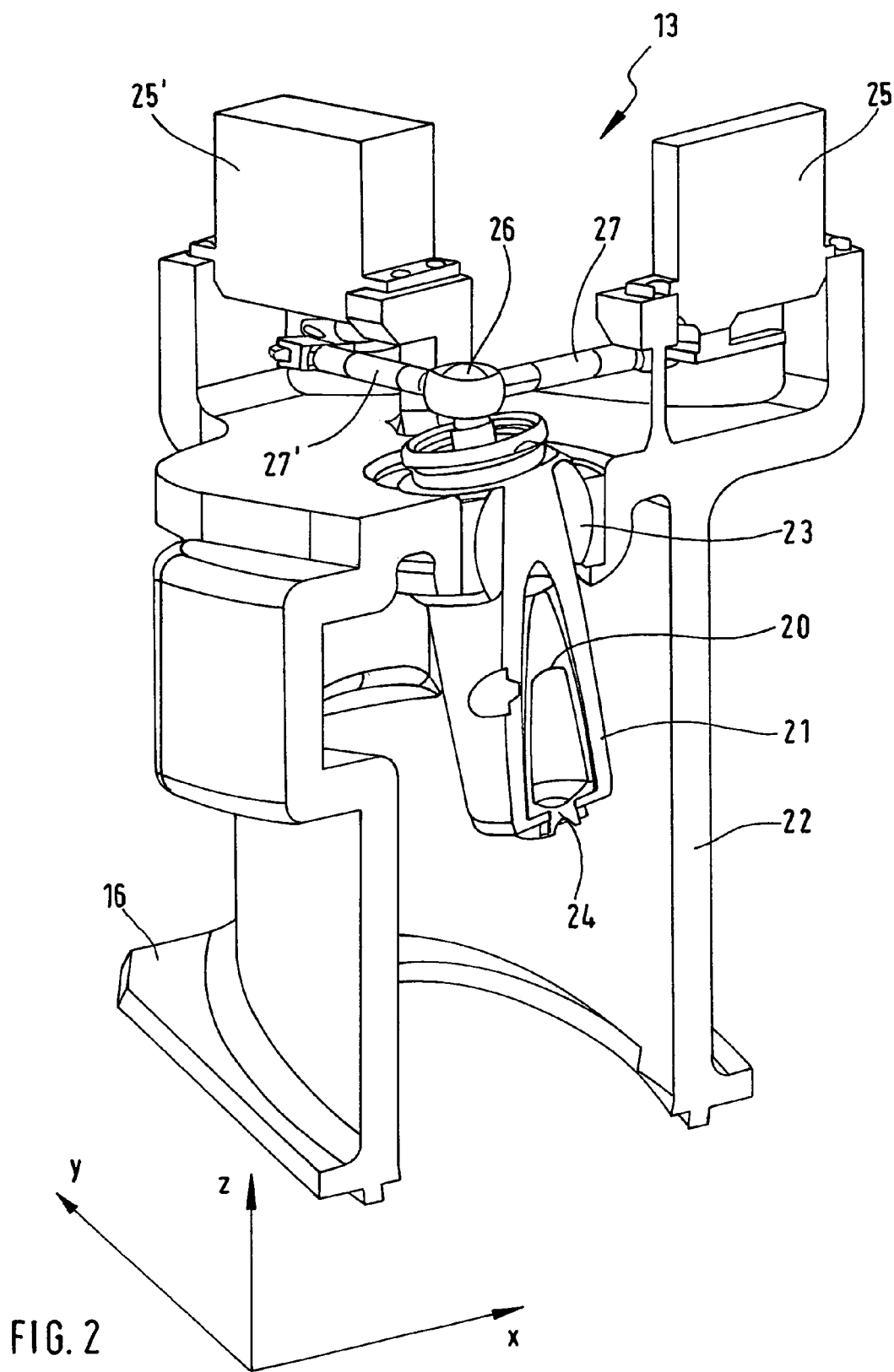
FIG. 2 is a sectional detail view of an embodiment of the temperature measuring instrument.

FIG. 2 is a view of an embodiment of the temperature measuring assembly and the position adjustment device.

The temperature measuring assembly 13 according to the embodiment comprises a point pyrometer 20 provided in a housing 21. Said housing 21 protects the point pyrometer 20 from mechanical and thermal loads and is connected to the wall 22 of the process chamber 16 via a ball joint bearing 23. Through a window 24 in the housing 21, the point pyrometer 20 detects the thermal radiation from a measurement region 14 of the uppermost powder layer. In order to prevent the window 24 from becoming dirty by process gases, the window 24 is blown, e.g. by nitrogen gas, so that process gases can be kept away from said window 24.

Figure 3:
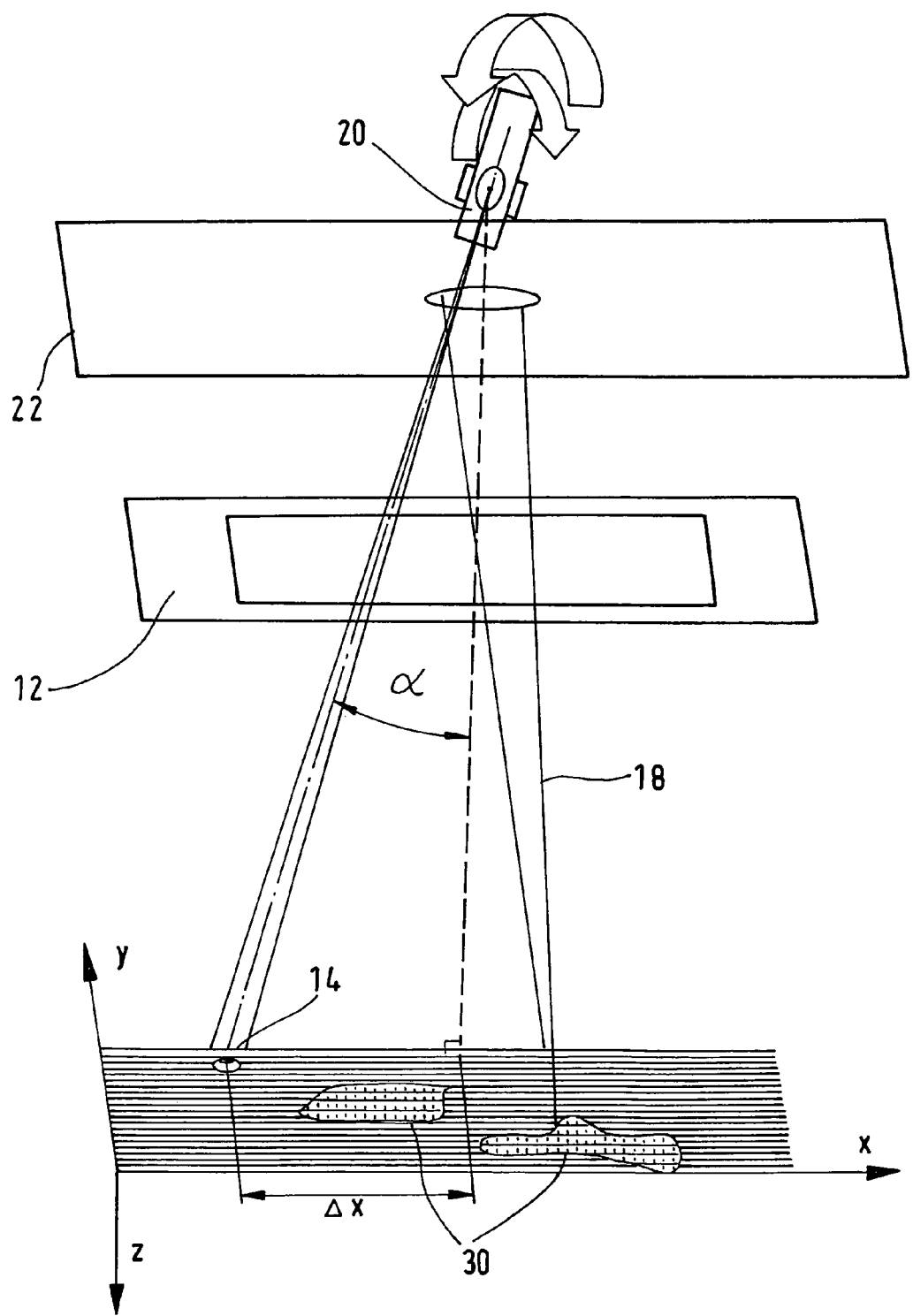
FIG. 3 is a schematic view of a detail of the apparatus shown in FIG. 1.

The measurement region of the point pyrometer 20 can be changed by swivelling in relation to the working plane. Therein, the point pyrometer is swivelled by means of two servomotors 25 and 25' which act on a point of action 26 of the housing 21 of the point pyrometer 20 by two servoarms 27 and 27'. The servomotor 25 is used to swivel the housing 21 of the point pyrometer 20 around the Y-axis while the servomotor 25' is used to swivel it around the X-axis. As can be seen particularly from FIG. 3, the position of the measurement region 14 is moved along the X-axis by the length ΔX by swivelling the point pyrometer 20 around the Y-axis by an angle α. Accordingly, the position of the measurement region is moved along the Y-axis by swivelling the point pyrometer 20 around the X-axis. In this manner, it is possible to change and adjust the position of the measurement region 14 of the point pyrometer entirely independently of the position of the beam spot generated by the irradiation assembly 6 in the working plane. That means that there is no fixed positioning relation between the position of the measurement region 14 and the position of the beam spot.

Operation of the laser sintering apparatus according to a method corresponding to a first exemplary embodiment will be described below.

Initially, a first powder layer is applied onto the support 2 by means of the coating device 8.

A decisive factor for the quality of the finished object is particularly a temperature of the uppermost powder layer to be solidified that lies within a certain range, i.e. the process window. Above said process window, the powder will, at least in part, be solidified by sintering, even without any additional radiation energy, whereas at temperatures below the process window strains or other undesired thermally produced effects will develop in the solidified layer. Often, the so-called curl effect which causes the edges of the solidified layer to bend or roll up, is attributed to a temperature of the uppermost powder layer that is too low. Before solidifying, the powder layer applied by means of the coating device must, therefore, be heated to a working temperature $T_A$ within the process window by means of the heating device 12, in order to obtain good results, particularly in order to prevent strains in the object produced.

To achieve this, the temperature of the powder layer, after the latter has been applied, is measured by means of the temperature measuring assembly 13 in a non-contact manner. The heat output of the heating device 12 is determined in relation to the temperature measured. Therein, the position of the measurement region 14 of the temperature measuring assembly 13 is adjusted by means of the position adjustment device 15 such that the measurement region 14 will not overlap with a region 30 in the layer, which is solidified in the following step by irradiating it with the laser. Hence, when the method according to the first embodiment is utilized, a region not to be exposed is actively accessed in each layer before said layer solidifies, in order to measure the temperature of the surface of the uppermost powder layer.

In the first embodiment, the measurement region is, preferrably, selected such that it is spaced apart from the regions in the layer, which are to be exposed, as well as from imaged regions in lower already solidified layers by a predefined distance. The greater this predefined distance, the lower the influence of the exposed regions on the temperature measurement. In particular, it can also be taken into account that compact sintered regions retain more heat so that, with the distance from the measurement region being the same, they have a greater influence on the temperature measurement than small sintered structures.

Once the uppermost powder layer has been heated up to the working temperature $T_A$, the positions in the powder layer corresponding to the cross-section of the object are solidified by irradiation with the laser. Also after the working temperature $T_A$ has been reached, the temperature T of the uppermost powder layer is still measured during the irradiation with the laser and, in relation thereto, the heat output of the heating device 12 is regulated in order to keep the temperature T inside of the process window.

After a layer has been solidified, the support 2 is lowered by a distance corresponding to the thickness of the layer, and the coating device 8 is used to apply a new powder layer onto the layer that has been exposed before by means of the laser. Thereafter, the steps described above are repeated until the manufacture of the three-dimensional object is completed.

According to the first embodiment, the position of the measurement region 14 in a layer is altered and/or adjusted before said layer is solidified and independently of the adjustment of the position of the region, on which electromagnetic or particle radiation is acting, while the layer is being solidified (beam spot region). That means that there is no consistent fixed positioning relation between the position of the measurement region 14 and the position of the beam spot region while the layer is being solidified.

Since the position of the measurement region of the temperature measuring assembly in each layer is located in an unexposed region, the irradiation of this region with the laser does not interfere with the temperature measurement. Hence, this allows a highly precise regulation and/or control of the temperature of the uppermost powder layer. The process window can be easily observed so that high-quality objects can be produced.

In a second embodiment of the method according to the invention, the position of the measurement region is also changed during the exposure. As a result, the temperature in a layer is measured at different positions so that a temperature distribution is measured.

The temperature distribution of the surface of the powder layer thus measured is used by the control device 17 for controlling the energy introduced by the laser radiation by controlling the local laser power of the irradiation assembly 6 and/or by controlling the scanning speed used by the deflection device 7 to move the directed laser beam across the building field during the exposure.

As in the first embodiment, the position of the measurement region in a layer is altered and/or adjusted independently of any change of the position of the beam spot region.

The method according to the invention corresponding to the second embodiment has the advantage that the measurement of the temperature distribution in the layer allows to detect local increases in temperature of the uppermost layer, which are caused by adjacent, already exposed regions of the same layer or by exposed regions of layers arranged underneath the uppermost layer. By correcting the local laser power of the irradiation assembly 6 and/or by controlling the scanning speed used by the deflection device 7 to move the directed laser beam across the building field during exposure, the process window for the energy introduced into the powder can be observed more precisely and the quality of the objects produced by means of the method can be considerably improved.

While exposure is in progress, the position of the measurement region is, preferably, altered such that said measurement region does not overlap with a region in the layer that is solidified at the moment or has already been solidified. As in the first embodiment, the method according to the second embodiment also allows to prevent the exposure by the laser from interfering with the temperature measurement.

Alternatives to and modifications of the apparatus described above and of the method described above are conceivable.

The apparatus according to the invention has been described such that the position of the measurement region of the temperature measuring assembly is altered by being swivelled through servomotors. It is, however, also possible to alter the position of the measurement region by providing plotter mechanics moving the temperature measuring assembly across the working plane along the X-axis and/or the Y-axis. However, this has the disadvantage that the plotter mechanics for the temperature measuring assembly may disturb the laser beam path.

A further possibility of altering the position of the measurement region of the temperature measuring assembly in the working plane is to provide the optical system of the pyrometer used to image the thermal radiation from the measurement region onto the actual thermal radiation sensor in the pyrometer in such a variable manner that the position of the measurement region can be altered by adjusting the variable optical system. In particular, the variable optical system may contain a tiltable mirror which can be used to image thermal radiation from various directions onto the thermal radiation sensor in the pyrometer, depending on the angular position of the mirror.

The apparatus according to the invention has been described such that a point pyrometer is used as temperature measuring assembly. However, it is likewise possible to use a multipoint pyrometer or an IR camera, which has a measurement region that is smaller in relation to the building field.

It is also possible to use a single-line CCD camera having a measurement region extending along the X-axis, wherein the position of the measurement region can be altered along the Y-axis. Vice versa, it is also possible to use a CCD camera having a measurement region extending along the Y-axis, wherein the position of the measurement region can be altered along the X-axis.

Instead of deflecting the laser beam onto the working plane in a selective manner by means of the deflection device and directing it to various positions of the working area, it is also possible to move the object relative to the laser.

The coating device has been described such that it is movable back and forth across the working plane. Alternatively, it is also possible to spray the building material as a layer onto the working area or to apply it thereon in any other manner.

The invention has been described by means of a laser sintering apparatus, which uses a laser as the source of radiation. Any other source of radiation, which can be used to introduce electromagnetic or particle radiation into the building material, is possible. For example, a radiation source for incoherent light radiation, for IR radiation, for X-ray radiation or for electron radiation may be used as source of radiation. According thereto, use must be made of a building material, which can be solidified by means of the respective radiation type.

In the apparatus described above, an infrared radiator above the working plane has been described as heating device. Other possibilities of heating a previously applied layer of the building material are conceivable. For example, use can be made of the circulation of hot air or nitrogen for preheating the layer, said hot air or nitrogen being conducted across the freshly applied layer.

As has been described above, the temperature distribution measured according to the method corresponding to the second embodiment can be used to control the energy introduced by laser radiation. Moreover, the temperature distribution can also be used to drive a heating device 12 for heating the surface of the powder bed 19. In particular, a heating device 12 having a plurality of zones can be driven, wherein a partial region of the measured temperature distribution is allocated to each zone of the heating device 12, in order to compensate for temperature differences of the temperature distribution caused by differing outputs of the individual zones.

When the method according to the first or second embodiment is utilized, it is, in addition to the adjustments or changes of the position of the measurement region 14 described there, also possible to alter the position of said measurement region 14 while solidification is in progress such that the measurement region 14 occasionally overlaps with regions that have already been solidified or are being solidified at the moment. The temperatures measured therein can be used to check and/or control the power of the irradiation assembly 6. What is more, the thermal capacity as well as the thermal conduction in X-/Y-direction or Z-direction, respectively, can be inferred from the progression of the temperature of a previously exposed region over time. Therein, the thermal capacity and the thermal conduction are decisive variables for an optimum selection of process parameters, such as the power or the scanning speed of the solidification radiation and the control parameters of powder preheating. The process parameters and, thus, the quality of the components and the building time can, therefore, be optimized in relation to such temperature measurements.

The invention claimed is:

1. An apparatus for the manufacture of a three-dimensional object by solidifying layers of a building material at the positions corresponding to the respective cross-section of the object, by the action of electromagnetic or particle radiation, the apparatus comprising:
a temperature measuring assembly for non-contact measurement of the temperature of the building material in a measurement region, which is a partial region of a layer of the building material, wherein the apparatus further comprises a position adjustment device for changing a position of the measurement region of the temperature measuring assembly independently of an alteration of the position of the region upon which said electromagnetic or particle radiation is acting,
wherein the position adjustment device comprises a swivelling device for changing an angular position of the temperature measuring assembly in relation to the layer of the building material, and the apparatus further comprises a control device, wherein the control device is configured to control the swivelling device such that the angular position of the temperature measuring assembly is modified individually for each layer.

2. An apparatus for the manufacture of a three-dimensional object by solidifying layers of a building material at the positions corresponding to the respective cross-section of the object, by the action of electromagnetic or particle radiation, the apparatus comprising:
a temperature measuring assembly for non-contact measurement of the temperature of the building material in a measurement region, which is a partial region of a layer of the building material, wherein the apparatus further comprises a position adjustment device for changing a position of the measurement region of the temperature measuring assembly independently of an alteration of the position of the region upon which said electromagnetic or particle radiation is acting,
wherein the position adjustment device comprises a mechanics, which can be used to move the temperature measuring assembly across the layer of the building material, and the apparatus further comprises a control device, wherein the control device is configured to control the movement of the position adjustment device such that the position of the measurement region is modified individually for each layer.

3. An apparatus for the manufacture of a three-dimensional object by solidifying layers of a building material at the positions corresponding to the respective cross-section of the object, by the action of electromagnetic or particle radiation, the apparatus comprising:
a temperature measuring assembly for non-contact measurement of the temperature of the building material in a measurement region, which is a partial region of a layer of the building material, wherein the apparatus further comprises a position adjustment device for changing a position of the measurement region of the temperature measuring assembly independently of an alteration of the position of the region upon which said electromagnetic or particle radiation is acting,
wherein the position adjustment device comprises an optical system, which can be used to display the thermal radiation emitted from the measurement region in the temperature measuring assembly and to alter the position of the measurement region, and the apparatus further comprises a control device, wherein the control device is configured to control the optical system such that the position of the measurement region is modified individually for each layer.

4. An apparatus according to claim 1, wherein the temperature measuring assembly is a point pyrometer.

5. An apparatus according to claim 1, further comprising a control device, which controls the acting electromagnetic or particle radiation in dependence of the temperature measured by the temperature measuring assembly.

6. An apparatus according to claim 1, further comprising a heating device for the building material and a control device, which controls the output of the heating device for the building material in relation to the temperature measured by the temperature measuring assembly.

7. An apparatus according to claim 1, wherein the apparatus is a laser sintering apparatus.

8. A method for the manufacture of a three-dimensional object, comprising the steps of:
(a) applying a layer of a building material to be solidified through electromagnetic or particle radiation, onto a base or a layer solidified before;
(b) solidifying the layer of the building material that was applied in step (a) by exposure to electromagnetic or particle radiation at the positions in the layer that are corresponding to the cross-section of the object;
(c) repeating the steps (a) and (b) until the three-dimensional object has been completed,
wherein the temperature of the building material is measured in a measurement region, which is a partial region of the applied layer by means of a temperature measuring assembly in a non-contact manner, wherein the position of the measurement region is adjusted or altered by means of a position adjustment device independently of any alteration of the position of the region upon which the electromagnetic or particle radiation acts in step (b), wherein the position adjustment device comprises a swivelling device for changing the angular position of the temperature measuring assembly in relation to the layer of the building material,
wherein the position of the measurement region is adjusted or altered by means of the position adjustment device such that the measurement region does not overlap with a region in the layer that is being simultaneously solidified.

9. A method according to claim 8, wherein the position of the measurement region is adjusted or altered by means of a position adjustment device such that the measurement region does not overlap with a region in the layer that has been solidified before in the layer.

10. A method according to claim 8, wherein the position of the measurement region is adjusted or altered such that the measurement region does not overlap with a region in the layer that is still to be solidified.

11. A method according to claim 8, wherein the building material is heated and the heating output used to this end is regulated depending on the temperature measured by the temperature measuring assembly.

12. A method according to claim 8, wherein the temperature of the building material in a layer is measured in a plurality of measurement regions that are different from each other.

13. A method according to claim 12, wherein the building material is heated in a plurality of heating regions allocated to the plurality of measurement regions in a region-dependent manner, and the heating output for the various heating regions is regulated or controlled depending on the temperature of the measurement regions allocated.

14. A method according to claim 8, wherein the local energy introduction of radiation energy for solidifying the layer is regulated depending on the temperature measured by the temperature measuring assembly.

15. A method according to claim 8, wherein the adjustment of the position of the measurement region is furthermore achieved such that the measurement region is spaced apart from the previously solidified regions in and underneath the uppermost layer by a predetermined distance.

16. A method according to claim 8, wherein use is made of a powder building material as well as of a laser as the source of radiation.

17. An apparatus according to claim 2, further comprising a control device, which controls the position adjustment device such that the measurement region of the temperature measuring assembly does not overlap with the region of the layer, upon which said electromagnetic or particle radiation is acting at the moment.

18. An apparatus according to claim 2, further comprising a control device, which controls the acting electromagnetic or particle radiation in dependence of the temperature measured by the temperature measuring assembly.

19. An apparatus according to claim 2, further comprising a heating device for the building material and a control device, which controls the output of the heating device for the building material in relation to the temperature measured by the temperature measuring assembly.

20. A method for the manufacture of a three-dimensional object, comprising the steps of:
  (a) applying a layer of a building material to be solidified through electromagnetic or particle radiation, onto a base or a layer solidified before;
  (b) solidifying the layer of the building material that was applied in step (a) by exposure to electromagnetic or particle radiation at the positions in the layer that are corresponding to the cross-section of the object;
  (c) repeating the steps (a) and (b) until the three-dimensional object has been completed,
  wherein the temperature of the building material is measured in a measurement region, which is a partial region of the applied layer by means of a temperature measuring assembly in a non-contact manner, wherein the position of the measurement region is adjusted or altered by means of a position adjustment device independently of any alteration of the position of the region upon which the electromagnetic or particle radiation acts in step (b), wherein the position adjustment device comprises a mechanics, which can be used to move the temperature measuring assembly across the layer of the building material,
  wherein the position of the measurement region is adjusted or altered by means of the position adjustment device such that the measurement region does not overlap with a region in the layer that is being solidified at the same time.

21. A method for the manufacture of a three-dimensional object, comprising the steps of:
  (a) applying a layer of a building material to be solidified through electromagnetic or particle radiation, onto a base or a layer solidified before;
  (b) solidifying the layer of the building material that was applied in step (a) by exposure to electromagnetic or particle radiation at the positions in the layer that are corresponding to the cross-section of the object;
  (c) repeating the steps (a) and (b) until the three-dimensional object has been completed,
  wherein the temperature of the building material is measured in a measurement region, which is a partial region of the applied layer by means of a temperature measuring assembly in a non-contact manner, wherein the position of the measurement region is adjusted or altered by means of a position adjustment device independently of any alteration of the position of the region upon which the electromagnetic or particle radiation acts in step (b), wherein the position adjustment device comprises an optical system, which can be used to display the thermal radiation emitted from the measurement region in the temperature measuring assembly and to alter the position of the measurement region,
  wherein the position of the measurement region is adjusted or altered by means of a position adjustment device such that the measurement region does not overlap with a region in the layer that is being solidified at the same time.

* * * * *